Figure 1:
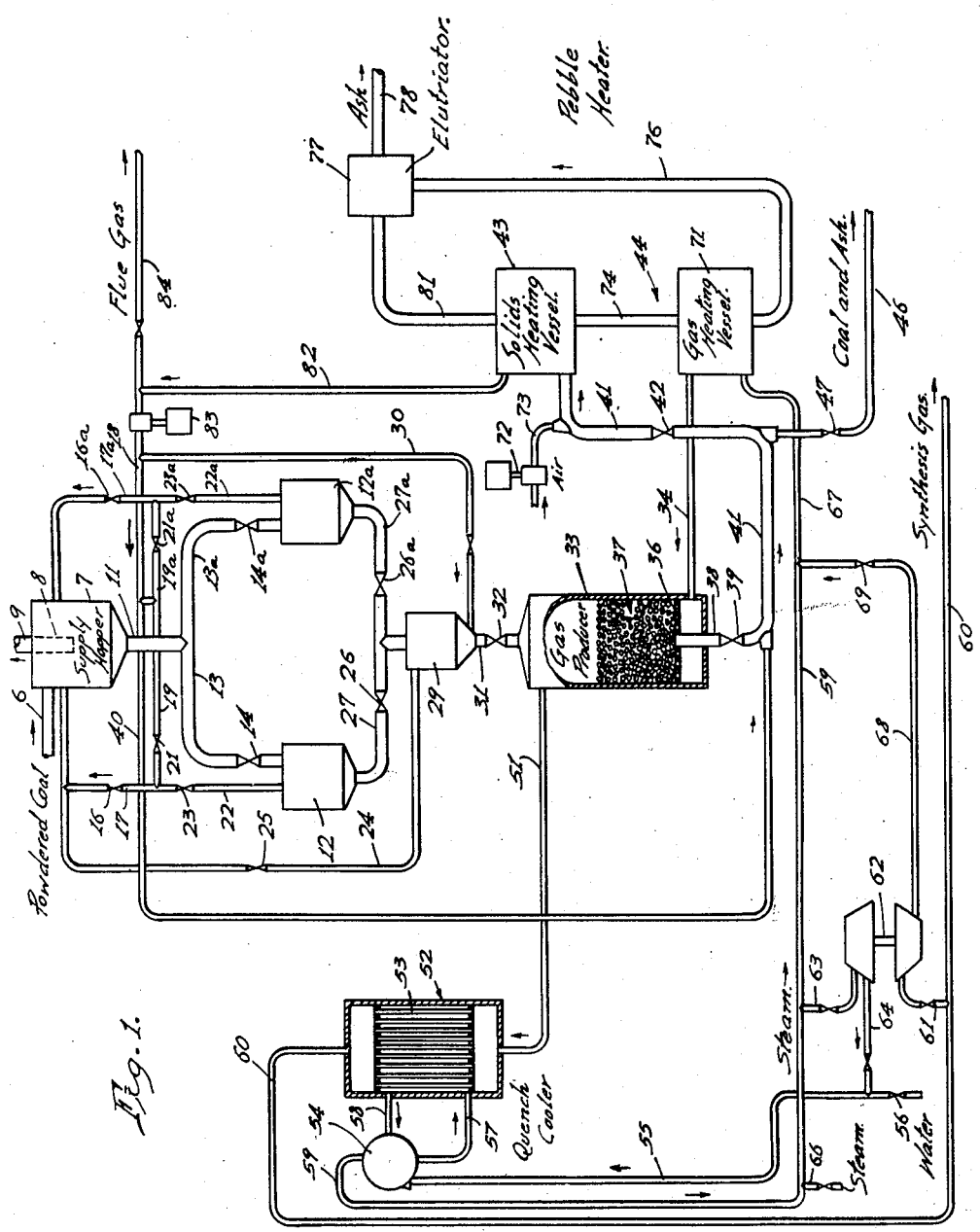

Nov. 9, 1954 E. M. GLAZIER 2,694,047
PRODUCTION OF GAS COMPRISING HYDROGEN AND CARBON MONOXIDE
Filed Oct. 27, 1950 2 Sheets-Sheet 1

INVENTOR.
Edwin M. Glazier.
BY
ATTORNEY—

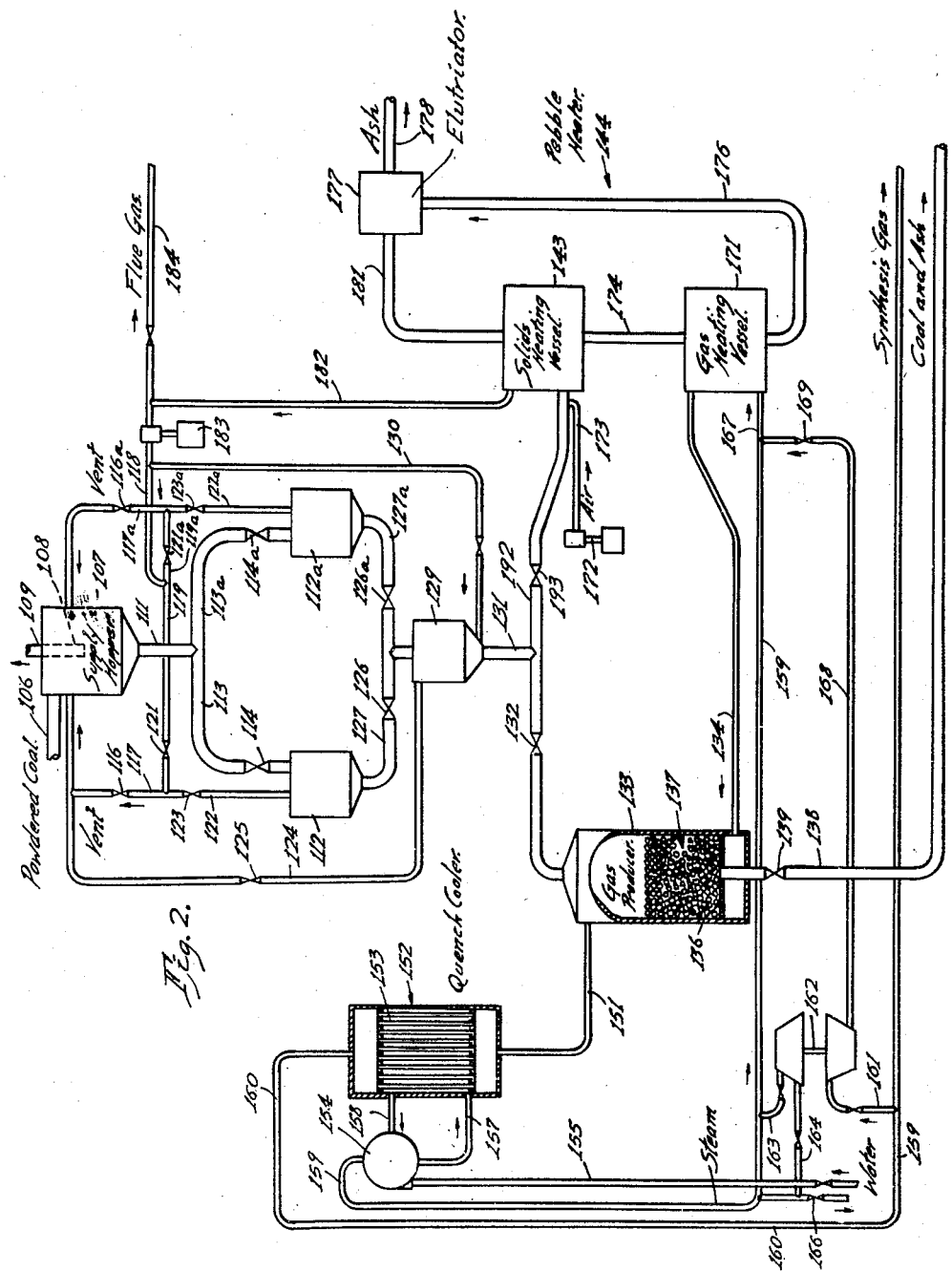

2,694,047

PRODUCTION OF GAS COMPRISING HYDROGEN AND CARBON MONOXIDE

Edwin M. Glazier, Verona, Pa., assignor to Gulf Research & Development Company, Pittsburgh, Pa., a corporation of Delaware Application October 27, 1950, Serial No. 192,491

7 Claims. (Cl. 252—373)

This invention relates to the production of a gas comprising hydrogen and carbon monoxide at a superatmospheric pressure. More particularly, it relates to the production of a mixture of hydrogen and carbon monoxide at a superatmospheric pressure from a fluidized mixture of steam and coal.

A gas comprising hydrogen and carbon monoxide at a superatmospheric pressure, such as a pressure in excess of 100 pounds per square inch, has many uses depending chiefly upon the relative amounts of hydrogen and carbon monoxide which are present in the gas. As an example, a gas which contains hydrogen and carbon monoxide in a mol ratio of about 10:1, can be used for making a commercially pure hydrogen. A gas containing hydrogen and carbon monoxide in the mol ratio of about 1:1 to 3:1 can be used as a synthesis gas in synthesis processes such as the Fischer-Tropsch process, especially if the gas is at a superatmospheric pressure in excess of about 100 pounds per square inch.

While an efficient continuous process for the production of a gas comprising hydrogen and carbon monoxide by the reactions between steam and a "coal," such as anthracite coal, bituminous coal, lignite, or coke, would obviously be advantageous, so far as known a commercially satisfactory process has not previously been described. The development of such a process presents difficult problems, because the reactions necessary to produce the gas are endothermic and do not take place efficiently except at elevated temperatures in excess of 1300° F. and especially at temperatures in the range of about 1700° to 1800° F.

I have found that a mixture of hydrogen and carbon monoxide can be produced at a superatmospheric pressure by reacting powdered coal and steam in a reaction zone at a superatmospheric reaction pressure and under conditions such that powdered coal is fluidized and all of the heat needed to maintain a desired reaction temperature is introduced as sensible heat of the reactants. When it is desired to produce a gas comprised chiefly of hydrogen, such as a product gas containing hydrogen and carbon monoxide in a mol ratio of about 10:1, the reactants introduced to the reaction zone consist of powdered coal and heated steam. When it is desired to produce a product gas containing an appreciable amount of carbon monoxide, for example when it is desired to produce a synthesis gas containing hydrogen and carbon monoxide in a mol ratio of about 1:1 to 3:1, the reactants introduced to the reaction zone consist of powdered coal, steam, and recycled synthesis gas which has previously been produced in the process. Thus in every case the reactants introduced to the reaction zone comprise powdered coal and steam, and in some cases recycled synthesis gas is also introduced to the reaction zone.

As stated previously, all of the heat necessary to maintain a desired reaction temperature in the reaction zone is introduced as sensible heat of the reactants. The powdered coal can be heated and some of the heat needed can be introduced as sensible heat of the powdered coal but usually most of the heat is introduced with the gaseous reactants. When the gaseous reactants consist of steam and recycled synthesis gas, it is usually convenient to mix the steam with the recycled synthesis gas and introduce the resulting mixture of steam and recycled synthesis gas to the reaction zone as a heated stream of gaseous reactants.

In order to maintain the reaction zone at a desired reaction temperature, it is necessary to heat the stream of gaseous reactants to an elevated temperature above the reaction temperature. In accordance with the invention, the stream of gaseous reactants is heated in a gas heating zone by heat exchange with solid, inert, high heat capacity particles which have previously been heated in a solids heating zone. Solid, inert, high heat capacity particles are sometimes referred to as "pebbles" and heaters in which pebbles are passed in turn through a solids heating zone and a gas heating zone are referred to as "pebble heaters."

Features of my invention are that a reaction zone, solids heating zone and the gas heating zone are each maintained at a superatmospheric reaction pressure, that powdered coal is reacted with steam in the reaction zone and burned with air in the solids heating zone to provide the heat necessary for the reaction, and that powdered coal burned in the solids heating zone is obtained at the superatmospheric reaction pressure within the process system. It will be understood that although the pressure in the various zones referred to above is characterized as a "superatmospheric reaction pressure," nevertheless there are sufficient pressure gradients through the process to insure necessary flow conditions.

In order that the invention can be understood more fully, preferred embodiments thereof will now be described in connection with the accompanying drawings which are hereby made a part of this specification. Each of Figures 1 and 2 is a simplified flow sheet for an embodiment of my invention in which various pieces of apparatus are illustrated more or less diagrammatically.

Referring to Figure 1, powdered coal suspended in air is introduced by means of line 6 to supply hopper 7. Air is removed from the supply hopper by means of separator 8 and is discharged through line 9. Powdered coal flows out of the supply hopper by line 11 and into a storage zone shown as a lock hopper 12 by line 13 containing slide valve 14. When the hopper is full, slide valve 14 and vent valve 16 in vent line 17 are closed and flue gas at a superatmospheric reaction pressure is introduced into lock hopper 12 from flue gas header 18 by flue gas line 19 containing valve 21, and line 22 containing valve 23 until the lock hopper is brought to the reaction pressure. Slide valve 26 in line 27 which leads from the bottom of the lock hopper is opened and coal flows downwardly to a pressure storage zone shown as a surge hopper 29 which is a pressure vessel with a conical bottom. As soon as lock hopper 12 is empty, slide valve 26 is closed. Valve 21 in flue gas line 19 is also closed and lock hopper 12 is vented into the supply hopper above the level of powdered coal by opening valve 16 in vent line 17. While this is being accomplished another lock hopper 12a is also being filled and pressured through a similar system (in which similar parts are identified by the same reference numerals with an added "a") so that as soon as one hopper is empty the other hopper is full of powdered coal under pressure. In this way powdered coal under pressure is introduced continuously to surge hopper 29. Surge hopper 29 contains sufficient capacity so that even if there is an interval between the time when coal is being introduced into it from line 27 or line 27a, nevertheless a constant supply of powdered coal is available in the surge hopper.

Powdered coal contained in surge hopper 29 which is at the reaction pressure is aerated by flue gas introduced by valved line 30 from flue gas header 18 into the conical bottom of the surge hopper. Flue gas can be introduced at one or more points at the same or different levels in the conical bottom of the surge hopper. Flue gas is passed from the top of surge hopper 29 to vent line 17 and then to the supply hopper 7 by means of valved line 24 containing pressure reducing valve 25 in order to prevent the accumulation of flue gas in the surge hopper.

Aerated coal flows downwardly from surge hopper 29 by means of line 31 to adjustable slide valve 32. Adjustable slide valve 32 adjusts the flow of powdered coal to a reactor shown as gas producer 33. In preferred operation this valve is set to deliver a constant amount of aerated powdered coal.

Powdered coal introduced into gas producer 33 is fluidized by a heated stream of gaseous reactants comprising steam and recycled synthesis gas. The stream is introduced into the gas producer by means of line 34 at the reaction pressure and at an elevated temperature above the reaction temperature. The heated stream flows into the bottom of gas producer 33 beneath foraminous plate 36 and then flows upwardly through reaction zone 37, the upwardly moving stream fluidizing powdered coal in the reaction zone. Fluidized coal reacts endothermically with steam to produce product gas, the necessary heat to maintain the reaction temperature being supplied by the heated stream.

A portion of the fluidized coal and ash is drawn off from the bottom part of reaction zone 37 by means of line 38. Fluidized coal is removed by valve 39 at a rate sufficient to prevent the ash content from building up in the reaction zone. The mixture of powdered coal and ash is aerated at the bottom of line 38 by flue gas under pressure from flue gas header 18 introduced by line 40. An aerated mixture of powdered coal, ash, and flue gas passes through line 41 containing slide valve 42 to a solids heating vessel 43 of a pebble heater 44 which will be described in detail below. A portion of the aerated stream of powdered coal, ash, and flue gas can be withdrawn from line 41 by line 46 containing slide valve 47 in cases where the amount of coal and ash necessary to provide the heat in the pebble heater is insufficient to maintain the desired low ash content in the gas producer.

The gas produced in the gas producer 33 is removed from near the top of this producer by means of line 51 and is transported to quench cooler 52. Quench cooler 52 contains a plurality of tubes 53 which are in indirect heat exchange with water supplied by steam drum 54. Water is introduced to the steam drum by water inlet line 55 containing valve 56. Water is passed from the bottom of the steam drum 54 to the bottom of the quench cooler by means of line 57. The mixture of steam and water produced in the quench cooler is removed from the top of the quench cooler by means of line 58. Steam at the desired pressure is removed from the top of the steam drum by means of line 59. Cooled product gas at the reaction pressure is passed from the quench cooler as synthesis gas by line 60. A portion of the synthesis gas is removed from line 60 and is passed by valved inlet line 61 to the recycle compressor 62 while the remaining portion of the synthesis gas is discharged as product gas at the desired superatmospheric pressure. Recycle compressor 62 is operated by steam from line 59 introduced by means of valved line 63. The steam is removed, passed through a condenser which is not shown, and returned as condensate to the water inlet line 55 by valved line 64. Steam can be introduced or removed from line 59 by valved line 66. Steam in line 59 is then passed to line 67. The synthesis gas, compressed in the recycle compressor, is passed by line 68 containing valve 69 to line 67. Steam from line 59 and compressed recycled synthesis gas from line 68 combine in line 67 to form a mixture of gaseous reactants which is introduced to the gas heating vessel 71 of the pebble heater 44.

The pebble heater 44 which comprises the previously mentioned solids heating vessel 43 and gas heating vessel 71 is operated as follows. Air is compressed in the compressor 72 to the reaction pressure and is introduced by line 73 to the line 41 in which is flowing the mixture of partially reacted powdered coal, ash, and flue gas at a point just prior to the introduction of the mixture to the solids heating vessel 43. Air mixes with the partially reacted powdered coal, ash, and flue gas, and the powdered coal and air burn to heat the pebbles which pass downwardly through this zone. The pebbles are preferably granules of a fused mixture comprising a large proportion of alumina and a small proportion of silica. Such granules are inert, physically strong, and have a high heat capacity. The heated pebbles and all of the ash are removed downwardly by means of line 74 to the gas heating vessel 71. In the gas heating vessel 71 the mixture of gaseous reactants introduced by means of line 67 is heated by heat exchange with the pebbles. The heated stream of gaseous reactants is then passed from the gas heating vessel 71 by line 34 and introduced to the gas producer as mentioned previously.

The cooled pebbles and all of the ash are removed from the bottom of the gas heating vessel 71 by means of line 76 and are recycled to an elutriator 77. In the elutriator ash is removed by means of line 78 and the pebbles are returned to the solids heating vessel by means of line 81.

The flue gas which is produced in the solids heating vessel is removed by line 82 and is passed to the compressor 83 and then to the flue gas header 18. A portion of the flue gas can be removed by valved line 84.

When operating in accordance with this embodiment to produce synthesis gas comprising hydrogen and carbon monoxide in a mol ratio of about 3:1 from lignite, the reaction zone can be maintained at a reaction pressure of 300 pounds per square inch and a reaction temperature of about 1700° F. The solids heating zone is preferably operated at a temperature of about 2600° F. The heated stream comprising steam and recycled synthesis gas is introduced to the reaction zone at a temperature of about 2500° F. The heated stream comprises about 5 pounds of steam and about 5.3 pounds of synthesis gas per pound of lignite charged to the reaction zone. The quench cooler is operated to cool the synthesis gas from the reaction temperature of about 1700° F. to a temperature of about 700° F. in less than one second and to produce steam at a temperature of about 430° F. and a pressure of about 350 pounds per square inch. The steam produced is sufficient to furnish the necessary steam for the reaction and to operate the recycle compressor. The steam introduced to the recycle compressor can be superheated. For example, it can be superheated by heat exchange with the flue gas in line 82.

A synthesis gas comprised essentially of hydrogen can be produced at a superatmospheric pressure by a process operated in accordance with the flow sheet described on Figure 1. When operating in this manner only steam and coal are introduced to the gas producer and none of the product gas is recycled. This is accomplished by shutting down the recycle compressor 62 by closing the valves in steam inlet line 63, condensate removal line 64, recycled synthesis gas inlet line 61, and valve 69 in the compressed recycled synthesis gas line 68. The steam which is produced in the quench cooler is introduced to the gas heating vessel 71 or is removed through valved line 66. The gas which is produced in the reaction zone is cooled in the quench cooler and is removed by means of line 60.

When operating an embodiment as described above, a gas comprising hydrogen and carbon monoxide in a mol ratio of about 10:1 is produced at a superatmospheric pressure when the reaction pressure is maintained at about 300 pounds per square inch, the reaction temperature is maintained at about 1700° F., and steam is introduced to the reaction zone at a temperature of about 2400° F. The steam furnishes the necessary heat to maintain the reaction zone at the reaction temperature of 1700° F. The gas is cooled in the quench cooler from the reaction temperature of about 1700° F. to an unreactive temperature of about 700° F. and steam is produced at a temperature of about 430° F. and a pressure of about 350 pounds per square inch. The necessary steam is introduced to the gas heating zone for heating and the heated steam is introduced to the reaction zone. The steam which is not charged to the reaction zone is discharged at this temperature and pressure.

Operation in accordance with the above-described embodiment has the advantage that all of the powdered coal needed at the reaction pressure to produce the desired gas comprising hydrogen and carbon monoxide in the reaction zone, and all of the powdered coal needed at the reaction pressure for combustion in the solids heating zone to heat high heat capacity particles as described above to the desired temperature, is introduced to these zones by passing powdered coal from a pressure storage zone containing powdered coal at the reaction pressure and passing a stream containing a mixture of partially reacted coal and ash from the reaction zone to the solids heating zone. By operating in this manner, the ash content in the reaction zone is maintained at the desired level and at least a substantial part of the partially reacted coal which is withdrawn from the reaction zone at the reaction pressure is efficiently utilized in the process. In addition the sensible heat of the partially reacted coal in the stream containing a mixture of this coal and ash is also used in the solids heating zone because it is unnecessary to heat the partially reacted coal to the combustion temperature in this zone.

Although there are the above-described advantages in removing a portion of the partially reacted coal from a reaction zone and introducing it mixed with ash to the solids heating zone of a pebble heater, nevertheless under some conditions it is frequently advantageous to remove only sufficient partly reacted coal and ash from the reaction zone to keep the weight per cent of ash in the reaction zone at a desired level and to introduce powdered coal directly into the solids heating zone of the pebble heater. Such an embodiment will now be described in connection with Figure 2. On this figure a number of the parts are similar to those of Figure 1 and these parts are indicated by the same reference characters as those employed on Figure 1 plus one hundred.

Powdered coal is constantly supplied to surge hopper 129 by a system similar to that described above in connection with Figure 1. Powdered coal is aerated in the surge hopper by flue gas passed by valved line 130 from flue gas header 118. Aerated coal flows downwardly through line 131 containing valve 132 to gas producer 133. A heated mixture of steam and recycled synthesis gas flows into the bottom of gas producer 133 by line 134 and passes upwardly through foraminous plate 136. The stream fluidizes the powdered coal, reacts endothermically with it to produce synthesis gas, and furnishes heat necessary to maintain the reaction zone at the reaction temperature.

A portion of the partially reacted coal and ash is drawn off from the bottom of reaction zone 137 by means of line 138. The amount is adjusted by means of valve 139 in order to maintain the ash content in the gas producer at a desired low level. Synthesis gas which is produced in gas producer 133 is removed from near the top of this producer by means of line 151 and is passed by this line to quench cooler 152.

Pebble heater 144 which comprises the solids heating vessel 143 and gas heating vessel 171 is operated as follows. Powdered coal under the reaction pressure is removed by line 192 from the pressure storage vessel 129 by line 131 at a rate determined by adjustable valve 193. Preferably this rate is substantially constant. Air is compressed in compressor 172 and is introduced by line 173 into line 192 just prior to the point where this line enters solids heating vessel 143. The powdered coal and air burn to heat the pebbles. The pebbles are passed downwardly by means of line 174 to gas heating vessel 171. A mixture of steam and recycled synthesis gas is introduced by means of line 167 to gas heating vessel 171, is heated therein, and is passed by line 134 to the gas producer as mentioned previously.

When operating in accordance with this embodiment to produce synthesis gas comprising hydrogen and carbon monoxide in a mol ratio of about 1:1 to 3:1 at a superatmospheric pressure, the reaction zone can be maintained at a reaction pressure of about 300 pounds per square inch and a reaction temperature of about 1700° F. The heated stream comprising steam is introduced to the reaction zone at a temperature of about 2500° F. The synthesis gas at a reaction pressure of about 300 pounds per square inch and a reaction temperature of about 2400° F. is rapidly cooled to a temperature of about 700° F. in the quench cooler. Steam is produced at a temperature of about 430° F. and a pressure of about 350 pounds per square inch. The steam is sufficient to provide the necessary steam for the reaction zone and to operate the recycle compressor.

The process described in Figure 2 can also be employed with minor adjustments for the production of a gas containing a large proportion of hydrogen at a superatmospheric pressure. In order to accomplish this, it is necessary that the heated stream of gaseous reactants introduced to reaction zone 137 by line 134 consist essentially of steam. This can be accomplished by closing down recycle compressor 162 by closing valves in inlet steam line 163, condensate removal line 164, recycled synthesis gas inlet line 161, and valve 169 in the compressed recycled synthesis gas line 168.

Operation in accordance with the second embodiment described above, in which powdered coal at a reaction pressure is introduced to a reaction zone and to a solids heating zone from a pressure storage zone containing powdered coal at the reaction pressure, has the advantage that the pebble heater comprised of the solids heating zone and a gas heating zone is operated at the reaction pressure with powdered coal as the fuel and that all of the powdered coal needed in both the reaction zone and the solids heating zone is supplied from the pressure storage zone which contains powdered coal at the reaction pressure.

In the embodiments illustrated in the drawings, powdered coal is introduced at reaction pressure to a pressure storage zone by means of lock hoppers which are in turn brought up to reaction pressure. This can also be accomplished by compressing an aqueous slurry of powdered coal to a pressure above the reaction pressure, heating the compressed slurry at the pressure above the reaction pressure to an elevated temperature at or above the temperature at which under the conditions existing in a pressure storage zone water is in vapor form, introducing the heated slurry into the pressure storage zone maintained at substantially the reaction pressure wherein the water flashes overhead as steam, and leaving the powdered coal at the reaction pressure in the pressure storage vessel. For example, when operating with a reaction pressure of about 300 pounds per square inch, the slurry is heated in a heat exchange zone to a temperature of above about 445° F. at a pressure of about 400 pounds per square inch. It is then introduced directly to the pressure storage zone. The steam is flashed overhead from the pressure storage zone and powdered coal at substantially the reaction pressure is then available to be employed as described in connection with the drawings.

While the invention has been described herein with particular reference to certain specific embodiments thereof by way of illustration, it is to be understood that the invention is not limited to such embodiments except as hereinafter defined in the appended claims.

I claim:

1. A process for continuously producing a gas comprising hydrogen and carbon monoxide at an elevated reaction temperature and superatmospheric pressure above about 100 pounds per square inch which comprises introducing powdered coal at atmospheric pressure into a storage zone; increasing the pressure in said storage zone from atmospheric to said superatmospheric pressure; passing powdered coal under said superatmospheric pressure from said storage zone to a pressure storage zone; passing a portion of powdered coal from said pressure storage zone into a reaction zone maintained at an elevated reaction temperature and said superatmospheric pressure; passing another portion of the powdered coal from said pressure storage zone into a heat exchange zone maintained at said superatmospheric pressure; burning the powdered coal in the presence of air in said heat exchange zone in heat exchange relationship with solid, inert, high heat capacity particles also introduced into said heat exchange zone; passing the heated inert particles from said heat exchange zone into a gas heating zone; introducing a gas comprising steam into the gas heating zone to effect heat exchange between said gas and the heated inert particles to heat said gas above the elevated reaction temperature; and introducing said heated gas into the reaction zone whereby the heated stream fluidizes powdered coal, furnishes the heat of reaction to maintain the reaction zone at said elevated reaction temperature, and reacts endothermically with said coal to produce a gas comprising hydrogen and carbon monoxide at an elevated temperature and superatmospheric pressure.

2. A process for continuously producing gas comprising hydrogen and carbon monoxide at an elevated reaction temperature and superatmospheric pressure above about 100 pounds per square inch which comprises alternately filling each of at least two storage zones with powdered coal at atmospheric pressure; bringing the pressure in said storage zone up to said reaction pressure; discharging powdered coal under pressure from said storage zone; venting said storage zone; introducing powdered coal discharged from said storage zone under pressure into a pressure storage zone; introducing powdered coal at a reaction pressure from said pressure storage zone into a reaction zone maintained at an elevated reaction temperature and a superatmospheric pressure and into a solids heating zone maintained at a superatmospheric pressure; flowing solid, inert, high heat capacity particles successively through said solids heating zone and a gas heating zone; burning powdered coal in air to heat said high heat capacity particles in the solids heating zone; contacting the resulting heated particles in said gas heating zone with a gas comprising steam to heat said gas by heat exchange with said resulting heated particles to a temperature above said elevated reaction temperature; and introducing said heated gas into the reaction zone whereby the heated gas fluidizes powdered coal, furnishes the heat of reaction to maintain the reaction zone at an elevated temperature, and reacts endothermically with said coal to produce said gas comprising hydrogen and carbon monoxide at said superatmospheric pressure.

3. A process for continuously producing gas comprising hydrogen and carbon monoxide at an elevated reaction temperature and superatmospheric pressure above about 100 pounds per square inch which comprises alternately filling each of at least two storage zones with powdered coal at atmospheric pressure; bringing the pressure in said storage zone up to said reaction pressure; discharging powdered coal under pressure from said storage zone; venting said storage zone; introducing powdered coal discharged from said storage zone under pressure into a pressure storage zone; introducing powdered coal at a reaction pressure from said pressure storage zone into a reaction zone maintained at an elevated reaction temperature and a superatmospheric pressure; passing a heated gas comprising steam at the reaction pressure and an elevated temperature above said reaction temperature into the reaction zone under conditions to fluidize said powdered coal, react endothermically with said coal to produce said gas comprising hydrogen and carbon monoxide, and furnish the heat of reaction to maintain the reaction zone at said elevated reaction temperature; removing a mixture of partially reacted powdered coal and ash from said reaction zone; removing said gas comprising hydrogen and carbon monoxide from said reaction zone at an elevated reaction temperature and said superatmospheric pressure; at the same time forming said heated gas comprising steam by flowing high heat capacity particles successively through a solids heating zone and a gas heating zone; introducing air into said solids heating zone containing solid, inert, high heat capacity particles; simultaneously passing to said solids heating zone a mixture of partially reacted powdered coal and ash removed from said reaction zone; burning said partially reacted powdered coal in said solids heating zone to heat said high heat capacity particles; removing said heated high heat capacity particles from the solids heating zone; introducing said heated high heat capacity particles and a gas comprising steam into said gas heating zone; heating said gas by heat exchange with said heated high heat capacity particles to a temperature above said elevated reaction temperature; removing the resulting heated gas comprising steam at the reaction pressure and an elevated temperature; and passing said gas to the reaction zone.

4. A process for continuously producing synthesis gas comprising hydrogen and carbon monoxide in a mol ratio of about 3:1 at a superatmospheric reaction pressure of about 300 pounds per square inch and an elevated reaction temperature which comprises introducing powdered coal at said superatmospheric reaction pressure into a reaction zone maintained at a temperature of about 1700° F.; introducing for each pound of coal about 10.3 pounds of gas containing about 5 pounds of steam and about 5.3 pounds of recycled synthesis gas at the reaction pressure and at a temperature of about 2500° F. into said reaction zone under conditions to fluidize said powdered coal, react endothermically with said coal to produce said synthesis gas, and furnish the heat of reaction to maintain said reaction zone at said reaction temperature of about 1700° F.; removing a mixture of partially reacted powdered coal and ash from said reaction zone to maintain the ash content within said reaction zone at a desired low level; removing said synthesis gas from said reaction zone; cooling the synthesis gas to about 700° F. in less than one second; recompressing a portion of said cooled synthesis gas; removing the remaining portion of the synthesis gas as product at the desired superatmospheric pressure; at the same time producing said heated gas comprising steam and recycled synthesis gas at a temperature of about 2500° F. by flowing high heat capacity particles successively through said solids heating zone and a gas heating zone; passing the mixture of partially reacted powdered coal and ash to said solids heating zone; introducing air to said solids heating zone; burning said partially reacted coal in said air to heat solid, inert, high heat capacity particles and ash to a temperature of above about 2600° F.; introducing said heated mixture of high heat capacity particles and ash, said recompressed synthesis gas, and the steam into said gas heating zone; heating the steam and recompressed synthesis gas by heat exchange with the heated mixture of high heat capacity particles and ash; recycling said high heat capacity particles to said solids heating zone; removing the heated steam and recompressed synthesis gas from said gas heating zone at said reaction pressure and at a temperature of above about 2500° F. to form a gas comprising steam and recycled synthesis gas; and passing said gas at said temperature and said pressure to said reaction zone.

5. A process for continuously producing gas comprising hydrogen and carbon monoxide at an elevated reaction temperature and a superatmospheric reaction pressure above about 100 pounds per square inch which comprises heating a slurry of powdered coal and water to a temperature at which the slurry is a mixture of steam and coal at the reaction pressure; introducing the heated mixture to a pressure storage zone maintained at the reaction pressure; removing the steam from said pressure storage zone; passing the heated powdered coal at the reaction pressure from the pressure storage zone into a reaction zone maintained at an elevated reaction temperature; passing a heated gas comprising steam at the reaction pressure and an elevated temperature above said reaction temperature into the reaction zone under conditions to fluidize said powdered coal, react endothermically with said coal to produce said product gas, and furnish the heat of reaction to maintain the reaction zone at said elevated reaction temperature; removing a mixture of partially reacted powdered coal and ash from said reaction zone; removing said gas comprising hydrogen and carbon monoxide from said reaction zone at an elevated temperature and said superatmospheric pressure; at the same time forming said heated gas comprising steam by flowing high heat capacity particles successively through said solids heating zone and a gas heating zone; introducing air into said solids heating zone containing solid, inert, high heat capacity particles; simultaneously passing to said solids heating zone a mixture of partially reacted powdered coal and ash removed from said reaction zone; burning said partially reacted powdered coal in said solids heating zone to heat said high heat capacity particles; removing said heated high heat capacity particles from the solids heating zone; introducing said heated high heat capacity particles and a gas comprising steam into said gas heating zone; heating said gas by heat exchange with said heated high heat capacity particles to a temperature above said elevated reaction temperature; removing the resulting heated gas comprising steam at the reaction pressure and an elevated temperature; and passing said gas to the reaction zone.

6. A process for continuously producing gas comprising hydrogen and carbon monoxide at an elevated reaction temperature and a superatmospheric reaction pressure above about 100 pounds per square inch which comprises heating a slurry of powdered coal and water to a temperature at which the slurry is a mixture of steam and powdered coal at the reaction pressure; introducing the heated mixture to a pressure storage vessel maintained at the reaction pressure; removing the steam from the pressure storage vessel; passing powdered coal at the reaction pressure from the pressure storage zone into a reaction zone maintained at an elevated reaction temperature; passing a heated gas comprising steam at the reaction pressure and an elevated temperature above said reaction temperature into the reaction zone under conditions to fluidize said coal, react endothermically with said coal to produce said product gas, and furnish the heat of reaction to maintain the reaction zone at said elevated reaction temperature; removing a mixture of partially reacted coal and ash from said reaction zone; removing said gas comprising hydrogen and carbon monoxide from said reaction zone at an elevated temperature and said superatmospheric pressure; at the same time forming said heated gas comprising steam by flowing high heat capacity particles successively through a solids heating zone and a gas heating zone; continuously introducing air and powdered coal from the pressure storage zone at the reaction pressure to a solids heating zone containing solid, inert, high heat capacity particles; heating said high heat capacity particles in said solids heating zone by the combustion of said coal in said air; introducing said high heat capacity particles and a gas comprising steam into a gas heating zone; heating said gas by heat exchange with said high heat capacity particles to a temperature above said elevated reaction temperature; recycling the cooled high heat capacity particles to said solids heating zone; removing the resulting heated gas comprising steam at the reaction pressure and an elevated temperature; and passing said gas to the reaction zone.

7. A process for continuously producing a gas comprising hydrogen and carbon monoxide at an elevated reaction temperature and superatmospheric pressure above about 100 pounds per square inch, which comprises introducing powdered coal into a reaction zone at said superatmospheric pressure, intermixing said powdered coal and a heated gas comprising steam in said reaction zone at said superatmospheric pressure under conditions to form a fluidized bed of powdered coal at said elevated reaction temperature to which said gas comprising steam reacts with said powdered coal to produce said gas comprising hydrogen and carbon monoxide at said superatmospheric pressure, removing a mixture comprising partially reacted powdered coal and ash from said reaction zone to maintain the ash content within said reaction zone at a desired low level, passing said mixture comprising partially reacted powdered coal and ash to a solids heating zone, flowing high heat capacity particles successively through said solids heating zone and a gas heating zone, each of said zones being at said superatmospheric pressure, burning said mixture comprising partially reacted powdered coal in said solids heating zone to heat said high heat capacity particles to a temperature substantially above said elevated reaction temperature, contacting the resulting heated particles in said gas heating zone with said gas comprising steam, whereby said gas comprising steam is heated by heat exchange with said resulting heated particles to a temperature above said elevated reaction temperature, and passing said gas to said reaction zone.

References Cited in the file of this patent

UNITED STATES PATENTS

| Number | Name | Date |
|---|---|---|
| 1,738,890 | Goodrich | Dec. 10, 1929 |
| 1,857,799 | Winkler | May 10, 1932 |
| 2,502,670 | Roberts et al. | Apr. 4, 1950 |